United States Patent
Kesse et al.

(10) Patent No.: US 7,201,137 B2
(45) Date of Patent: Apr. 10, 2007

(54) MIXED MODE CONTROL METHOD AND ENGINE USING SAME

(75) Inventors: Mary L. Kesse, Peoria, IL (US); Kevin P. Duffy, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/178,738

(22) Filed: Jul. 11, 2005

(65) Prior Publication Data

US 2007/0006841 A1    Jan. 11, 2007

(51) Int. Cl.
*F02B 3/00* (2006.01)
*F02B 3/04* (2006.01)

(52) U.S. Cl. ..................... 123/299; 123/295

(58) Field of Classification Search ............... 123/299, 123/300, 305, 295; 239/558
See application file for complete search history.

(56) References Cited

U.S. PATENT DOCUMENTS

| | | | |
|---|---|---|---|
| 5,458,292 A | 10/1995 | Hapeman | |
| 6,182,632 B1 | 2/2001 | Yanagihara | |
| 6,230,683 B1 | 5/2001 | Zur Loye et al. | |
| 6,390,082 B1 | 5/2002 | Duffy et al. | |
| 6,453,874 B1 | 9/2002 | Duffy et al. | |
| 6,467,452 B1 | 10/2002 | Duffy et al. | |
| 6,470,849 B1 | 10/2002 | Duffy et al. | |
| 6,516,774 B2 | 2/2003 | Zur Loye et al. | |
| 6,561,157 B2 | 5/2003 | Zur Loye et al. | |
| 6,606,974 B1 | 8/2003 | Duffy et al. | |
| 6,659,071 B2 | 12/2003 | LaPointe et al. | |
| 6,668,789 B1 | 12/2003 | Marriott et al. | |
| 6,684,852 B2 | 2/2004 | Wright et al. | |
| 6,725,838 B2 * | 4/2004 | Shafer et al. | 123/446 |
| 6,769,635 B2 | 8/2004 | Stewart et al. | |
| 6,845,747 B2 | 1/2005 | Rasmussen et al. | |
| 6,978,760 B2 * | 12/2005 | Stewart et al. | 123/299 |
| 2003/0066509 A1 * | 4/2003 | Shafer et al. | 123/305 |
| 2004/0011323 A1 * | 1/2004 | Hilger et al. | 123/298 |
| 2004/0267430 A1 | 12/2004 | Ancimer | |
| 2005/0098144 A1 * | 5/2005 | Stewart et al. | 123/299 |
| 2005/0229900 A1 | 10/2005 | Weber et al. | |

* cited by examiner

*Primary Examiner*—Mahmoud Gimie
(74) *Attorney, Agent, or Firm*—Liell & McNeil

(57) ABSTRACT

A method of mixed mode operation of an internal combustion engine includes the steps of controlling a homogeneous charge combustion event timing in a given engine cycle, and controlling a conventional charge injection event to be at least a predetermined time after the homogeneous charge combustion event. An internal combustion engine is provided, including an electronic controller having a computer readable medium with a combustion timing control algorithm recorded thereon, the control algorithm including means for controlling a homogeneous charge combustion event timing and means for controlling a conventional injection event timing to be at least a predetermined time from the homogeneous charge combustion event.

20 Claims, 3 Drawing Sheets

MIXED MODE CONTROL METHOD AND ENGINE USING SAME

STATEMENT OF GOVERNMENT INTEREST

The United States Government has certain rights in the present patent application, and any patent that may issue thereon, under DOE Contract No. FC05-97OR22605.

TECHNICAL FIELD

The present disclosure relates generally to methods of controlling an internal combustion engine, and relates more particularly to a mixed mode operating method that includes controlling a homogeneous charge combustion event timing and a conventional injection event timing in an engine cycle.

BACKGROUND

The sophistication of internal combustion engines and engine operating schemes continues to advance, and innovations in design and operation are revealed regularly. One driving force behind many of the design changes in recent years have been increasingly stringent engine emissions requirements. One general approach to improving emissions quality relates to treatment of combustion products downstream from the engine. In other words, exhaust gases produced by the engine are treated via a variety of chemical and/or physical processes in an attempt to remove, alter or reduce undesired constituents. Other engine developers have focused more on the combustion process itself. Manipulation of fuel injection quantity, frequency, timing and even the type of fuel spray pattern has been shown to have various effects on engine emissions. Of particular interest to engineers are increasingly stringent jurisdictional standards relating to emission limits on various nitrogen-oxygen compounds, known collectively as "NOx".

It has been discovered that enhancing mixing of air and fuel prior to ignition in an internal combustion engine cylinder can help reduce NOx levels in the engine exhaust. One approach in particular is known in the art as "homogeneous charge" compression ignition. In the compression ignition engine arts, this approach is widely referred to as "HCCI". In a homogeneous charge mode, fuel may be injected into a compression ignition engine cylinder prior to the point during an engine cycle at which cylinder conditions will trigger autoignition. This differs from a more traditional approach, wherein fuel is primarily injected during an engine cycle at or close to a point at which autoignition can occur. In other words, rather than fuel more or less continuously combusting as it leaves the fuel injector tip, in homogeneous charge mode the fuel may be injected in advance of autoignition conditions, such that the fuel and air have relatively more time to mix as the piston travels upward in the cylinder.

Homogeneous charge operation tends to be relatively sensitive to various operating conditions external to and internal of the engine. Ambient temperature and pressure, as well as the timing of autoignition conditions in the engine cycle, for example, can affect the ability of an engine to successfully operate in a homogeneous charge mode. In particular, the combustion phasing of HCCI charges tends to vary in response to varying operating conditions.

In certain instances, it may be desirable to operate an engine in a mixed homogeneous charge and conventional mode, employing both HCCI fuel injections and conventional fuel injections during operation. Some operating schemes actually utilize both injection types in the same engine cycle. Where multiple fuel injections are delivered in the same engine cycle, control over the appropriate combustion phasing of the respective charges becomes even more difficult.

U.S. Pat. No. 6,668,789 to Marriott et al. is directed to one type of HCCI operating scheme stated to obviate certain problems relating to combustion event timing. In particular, Marriott employs multiple injections during a piston compression stroke, with the second injected charge serving as an ignition means for the first injected charge. While Marriott appears to offer advantages in certain operating environments, there is always room for improvement.

The present disclosure is directed to one or more of the problems or shortcomings set forth above.

SUMMARY OF THE INVENTION

In one aspect, the present disclosure provides a method of mixed mode operation of an internal combustion engine. The method includes the steps of, controlling a homogeneous charge combustion event timing in a given engine cycle, and controlling a conventional charge injection event timing in the given engine cycle to be at least a predetermined time after the homogeneous charge combustion event.

In another aspect, the present disclosure provides an internal combustion engine. The internal combustion engine includes a housing having at least one cylinder, with a fuel injector disposed at least partially therein. At least one electronic controller is provided, and is in control communication with the fuel injector. The at least one electronic controller includes a computer readable medium with a combustion timing control algorithm recorded thereon, the control algorithm including means for controlling a homogeneous charge combustion event timing in a given engine cycle, and means for controlling a conventional charge injection event timing in the given engine cycle to be at least a predetermined time after the homogeneous charge combustion event.

In still another aspect, the present disclosure provides an article having a computer readable medium with a first loop control algorithm recorded thereon which includes means for controlling a homogeneous charge combustion event timing in a given engine cycle of an internal combustion engine, based at least in part on a determined homogeneous charge combustion event timing in a preceding engine cycle, and a second loop algorithm for controlling a conventional injection event timing, based in part on at least one of, the determined homogeneous charge combustion event timing in the preceding engine cycle and a determined homogeneous charge combustion event timing in the given engine cycle.

DETAILED DESCRIPTION

Figure 1:
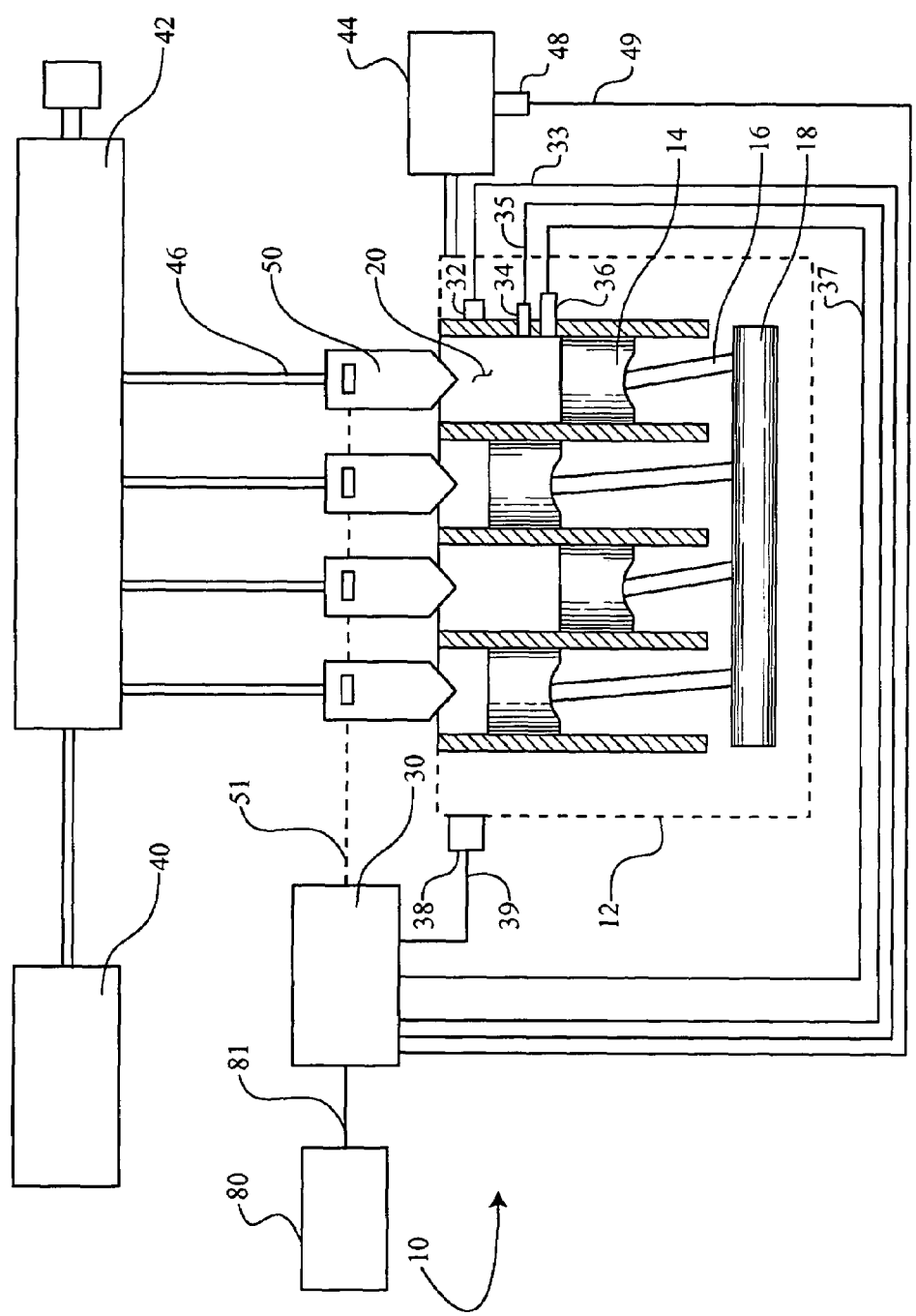
FIG. 1 is a diagrammatic side view of an internal combustion engine according to the present disclosure.

Referring to FIG. 1, there is shown an engine 10 according to the present disclosure. Engine 10 includes an engine housing 12 and at least one cylinder 20, for example, a plurality of cylinders 20 disposed therein. Engine 10 may further include a piston 14 positioned at least partially within cylinder 20 and reciprocable therein in a conventional manner. A piston rod 16 may connect piston 14 with a crankshaft 18 in a conventional manner. A source of pressurized fuel or a pump 40 may be provided and coupled to at least one fuel injector 50. The at least one fuel injector 50 may be a mixed mode fuel injector disposed at least partially within cylinder 20, for example a plurality of mixed mode fuel injectors 50 coupled with pump 40 via supply passages 46 and a common rail 42. Conventional fuel injectors with only one available spray pattern could also be utilized. While it is contemplated that engine 10 will typically include a plurality of cylinders each having a corresponding fuel injector, cylinder 20 and fuel injector 50 are referred to in the singular herein for ease of description. Engine housing 12 may be coupled with an exhaust system 44, and with a turbocharger (not shown). It is contemplated that engine 10 may be a compression ignition common rail diesel engine. It should be appreciated, however, that other engine designs, and other engine fuel systems such as an engine having one or more unit pump injectors might be used rather than a common rail.

Engine 10 may further include an electronic controller 30 operable to control and/or monitor certain engine operating parameters. Electronic controller 30 may be in communication via a communication line 37 with a pressure sensor 36 exposed to a fluid pressure of cylinder 20, for example disposed at least partially therein. Cylinder pressure sensor 36 may include, for instance, a piezoelectric sensor exposed to cylinder 20. Piezoelectric sensors may include one or more piezoelectric diaphragms, generating a particular voltage or change in voltage upon experiencing a certain degree of deflection or rate of change in deflection due to cylinder pressures. Engine 10 may include a plurality of pressure sensors, disposed one with each of cylinders 20, however, a single pressure sensor associated with only one cylinder might be used without departing from the scope of the present disclosure. An engine temperature sensor 34 may also be positioned at least partially within cylinder 20 and connected with electronic controller 30 via another communication line 35. An exhaust sensor such as an engine exhaust temperature or NOx sensor 48 may be coupled with exhaust system 44 and in communication with electronic controller 30 via yet another communication line 49. A detonation sensor 32 may also be provided, positioned for example adjacent housing 12. Sensor 32 may be in communication with electronic controller 30 via yet another communication line 33 to allow electronic controller 30 to determine a time or an approximate time of ignition of a fuel charge in cylinder 20. An engine speed sensor 38 may also be coupled with engine 10 and in communication with electronic controller 30 via another communication line 39.

Figure 2:
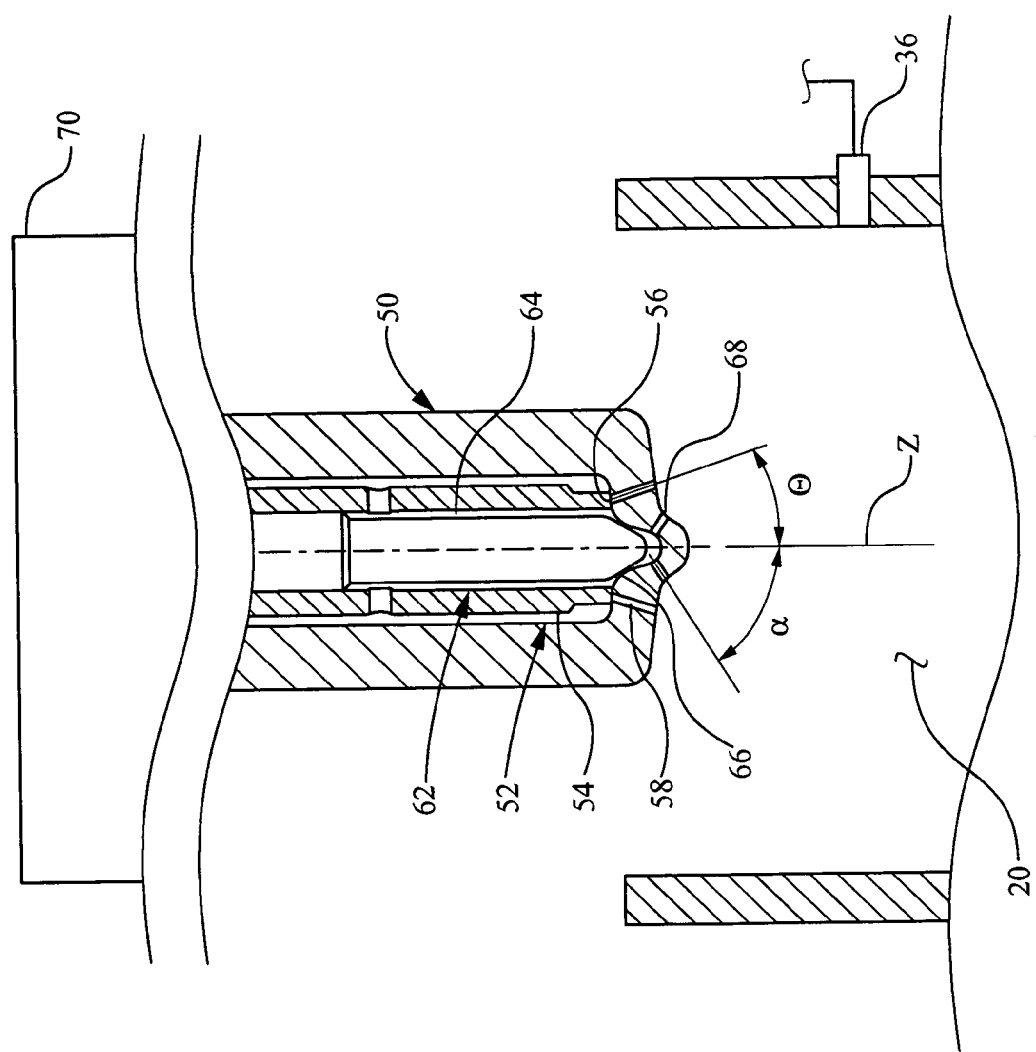
FIG. 2 is a partially sectioned side view of a portion of the internal combustion engine of FIG. 1.

Referring also to FIG. 2, electronic controller 30 may also be in control communication with fuel injector 50 via yet another communication line 51. Fuel injector 50 may be a mixed mode fuel injector disposed at least partially within cylinder 20, and having at least two available spray patterns, as described herein. A variety of suitable mixed mode fuel injectors are known in the art. One exemplary suitable mixed mode fuel injector is known from U.S. Pat. No. 6,725,838 to Shafer et al. Injector 50 may be a dual concentric check fuel injector, including a first or outer check 52 and a second or inner check 62. In one embodiment, outer check 52 may be thought of as a homogeneous charge, or HCCI check, whereas inner check 62 may be thought of as a conventional check, due to their respective spray patterns, as described herein. It should be appreciated that the terms "inner" and "outer" should not be understood to limit the HCCI check or the conventional check to a particular position. Alternative embodiments are contemplated wherein the outer check is the "conventional check" and the inner check is the HCCI check.

Outer check 52 may include a first valve member 54 operable to open or close a first set of injection orifices 58 by moving from or against a first seat 56, respectively. Inner check 62 in turn may include a second valve member 64 operable to open or close a second set of injection orifices 68 by moving from or against a second seat 66, respectively. A control valve assembly 70 may be coupled with fuel injector 50 and with electronic controller 30 to control the opening and closing of outer check 52 and inner check 62, and thus the timing and duration of fuel injections via each respective check. In one contemplated embodiment, electronic controller 30 will be operable to selectively open either or both of first check 52 and second check 62 to inject fuel through the desired corresponding set(s) of injection orifices. Electronic controller 30 may further be operable to command the respective injection(s) at a selected time during a given engine cycle, as described herein.

First set of injection orifices 58 may include a plurality of injection orifices disposed at a first average spray angle $\alpha$ relative to an axis Z of cylinder 20. Second set of injection orifices 68 may include a plurality of injection orifices different from first set 58 that are disposed at a second average spray angle $\theta$ relative to axis Z that is larger than first average spray angle $\alpha$. Injection orifices 58 may thus define a first spray pattern of fuel injector 50, whereas injection orifices 68 may define a second, different spray pattern of fuel injector 50. Those skilled in the art will appreciate that alternative means for providing different spray patterns might be employed without departing from the scope of the present disclosure. For instance, rather than separate sets of injection orifices having different average spray angles, sets of orifices having different sizes or different numbers might be utilized to provide more than one available spray pattern of fuel injector 50.

The present disclosure further provides a method of mixed mode operation of internal combustion engine 10. The method may include the steps of controlling a homogeneous charge combustion event timing in a given engine cycle, and controlling a conventional charge injection event timing in the given engine cycle to be at least a predetermined time after the homogeneous charge combustion event. Control over conventional charge injection event timing may take place by controlling a timing of conventional fuel charge injection via well-known methods.

Controlling homogeneous charge combustion event timing may further include the step of injecting a homogeneous fuel charge into cylinder 20 prior to development of autoignition conditions during the given engine cycle. Controlling the conventional injection event timing will in turn typically include injecting the conventional fuel charge after autoignition conditions have arisen in the given engine cycle. Injection of the homogeneous fuel charge will typically be via the first spray pattern of fuel injector 50, whereas injection of the conventional fuel charge will typically be via the second spray pattern of fuel injector 50, as described herein. Nevertheless, both injections could be in a same spray pattern from a common set of holes, and possibly even be from a fuel injector with only one available spray pattern. The conventional injection fuel amount will typically comprise less than about 50% of the total injected fuel quantity during the given engine cycle, and may comprise less than about 30%, however the present disclosure is not limited to such ranges. In certain embodiments, a relatively large, homogeneous charge injection may be used to provide for the majority of the engine's power demand, and conventional injections used as needed to round out the power demands. An upper limit may be reached as to the size of the homogeneous charge injections that engine 10 can accommodate, however.

In particular, above a certain homogeneous charge injection size threshold, the combustion pressures and pressure spikes may exceed hardware limitations. Where the engine power demand is above a threshold that may be accommodated solely by homogeneous charge operation, increasingly large conventional injections may be added per each engine cycle generally apace with any power demand increase. The converse situation may be true where engine power demand is decreasing. Thus, above a certain power threshold, homogeneous charge injection size may remain relatively constant, with changes in power demand being accommodated by changes only in the size of the conventional injection. Those skilled in the art will appreciate, however, that the variety of operating schemes, in particular the variety of ways of apportioning fuel between the two charges, is virtually infinite, and the apportionment scheme described herein should not be construed in a limiting sense.

Control over the homogeneous charge combustion event timing may take place by any of a wide variety of known means suitable for advancing or retarding timing of the combustion event. Variable valve timing, for example, may be employed to vary the timing of autoignition conditions in cylinder 20 and thereby affect the time at which a homogeneous charge injected into cylinder 20 autoignites. The technique known in the art as "exhaust gas recirculation" may also be used to retard or advance autoignition and/or alter a duration of a homogenous charge combustion event. In some instances, an increase in hot exhaust gases pumped into the intake manifold of engine 10 may advance autoignition by raising the in-cylinder temperatures, for example. Exemplary suitable variable valve timing and exhaust gas recirculation schemes are set forth in U.S. Pat. No. 6,769, 392 to Lawrence et al. Control over intake manifold temperature, for instance by controlling coolant flow, may also be used to control the timing of autoignition in cylinder 20 and thus control the combustion phasing of a homogeneous charge injected therein. Adjustment of oil flow in the engine head may also be used to control the timing of autoignition conditions, as may varying the cylinder compression ratio.

The homogeneous charge combustion event of particular interest will typically be a start of combustion. Those skilled in the art, however, will appreciate that the particular event whose timing is manipulated or maintained need not be limited to the start of combustion. For instance, timing of the end of combustion of the homogeneous charge, or the timing of some other combustion landmark or even an arbitrary point between the start and end of combustion might be controlled without departing from the scope of the present disclosure.

The present disclosure may further include the step of determining a value indicative of a homogeneous charge combustion event timing in a preceding engine cycle, for instance a start of combustion. The determined value may then serve as the basis for advancing or retarding homogeneous charge combustion event timing in a subsequent engine cycle. In such an embodiment, the determined value may serve as a feedback term for closed loop control over homogeneous charge combustion event timing. As used herein, the term "value indicative of" should be understood to refer to values arising from both direct measurements of the quantity or characteristic of interest, as well as indirect measurements or estimates based on values, quantities, etc. having a known or ascertainable relationship with the characteristic of interest. In the present disclosure, the described determination may be made at least in part with cylinder pressure sensor 36, operable to determine a value indicative of at least one of, cylinder pressure and a rate of change in cylinder pressure of cylinder 20. Cylinder pressure changes associated with a start of combustion of a fuel charge in an internal combustion engine are well known in the art, and provide one practical means for determining a start of combustion. It will be recalled, however, that the controlling step is not limited to simply controlling a start of combustion, and determination of cylinder pressures may be used in controlling the timing of other combustion events, as described herein.

Cylinder pressure sensor 36 may include, for instance, a piezoelectric sensor exposed to cylinder 20. Rather than measuring cylinder pressure directly, another means for determining the value indicative of at least one of, cylinder pressure and rate of change in cylinder pressure may include an optical sensor. Certain optical sensors may be employed to determine an amplitude of transmitted light within the cylinder, having a known relationship with cylinder pressure, which in turn may allow a determination of a start of combustion. Such sensors are commercially available from Optrand, Inc. of Plymouth, Mich. Other suitable optical sensors include an interferometer operable to measure changes in light frequency in a semi-permeable cavity that changes shape based on cylinder pressure. Such interferometer sensors are commercially available from Fiber Dynamics, Inc. of High Point, N.C. Yet another suitable sensor type may include a micro-strain gauge cylinder pressure sensor. Such sensors are operable to determine the relatively small movements of a glow plug rod in the cylinder in proportion to changes in cylinder pressure, and are commercially available from Texas Instruments of Dallas, Tex. Ion sensors manufactured by Woodward Governor of Rockford, Ill., which measure the levels of ions in the vicinity of an in-cylinder probe may also be used. Those skilled in the art will appreciate that still further suitable means for determining a value indicative of cylinder pressure and/or changes in cylinder pressure are available, or yet to be discovered, whose use in the described context will fall within the intended spirit and scope of the present disclosure.

The determining step may further include determining a selected mass fraction burn point of the homogeneous charge combustion event in the preceding engine cycle. The selected mass fraction burn point may be a 50% mass fraction burn point, for instance, representing a point at which 50% of the fuel injected in the homogeneous charge fuel injection has burned. The 50% mass fraction burn point provides one practical, readily identifiable landmark for determining a start of combustion of the homogeneous charge fuel injection, however, those skilled in the art will appreciate that another mass fraction burn point or an altogether different determinable value might be selected if desired.

The method of the present disclosure may further include the steps of determining another value indicative of a homogeneous charge combustion event timing during an engine cycle, and controlling a conventional injection fuel amount based in part on the determined value. The determined value may be the homogeneous charge combustion event timing in the given engine cycle, or in a preceding engine cycle. In other words, the conventional charge fuel injection amount may be based in part on the homogeneous charge combustion event timing in the same or an earlier engine cycle.

Each cylinder 20 of engine 10 will provide a certain amount of power during each engine cycle. When running in a mixed mode, the relative proportion of this power supplied by the respective homogeneous charge and conventional fuel injections may vary, depending upon the combustion phasing of the respective charges. Moving the homogeneous charge combustion phasing relatively closer to a top dead center position of piston 14 may allow a relatively greater proportion of the homogeneous charge combustion energy to be converted into positive torque on crankshaft 18. This is due at least in part to the fact that expanding gases from the combustion retard the upward travel of piston 14 relatively less where the combustion itself takes place relatively closer to the top dead center position of piston 14. In contrast, where autoignition of the homogeneous charge occurs when piston 14 is relatively lower in cylinder 20, upward travel of piston 14 will be relatively more greatly retarded by combustion of the homogeneous charge, as the pressure increase from combustion gases will resist the upward motion of piston 14 until it reaches top dead center.

The fuel quantity combusted during each engine cycle will typically be determined at least in part based on a power demand on engine 10. A homogeneous charge fuel amount map or "HCCI map", for instance a look-up table, may be programmed into electronic controller 30. Neural networks and the like might also be used without departing from the scope of the present disclosure. Homogeneous charge injection amount and injection timing may be mapped, for example, to engine speed and/or load. A separate map for conventional charge injection amount and/or timing may also be programmed into electronic controller 30. The conventional injection amount may also be mapped to engine speed and/or load. The portion of the engine power demand not provided for by the homogeneous charge may be provided by the conventional charge. If, for example, the homogeneous charge provides 70% of the power demand, electronic controller 30 may determine the fuel amount necessary to provide the remaining 30% via the conventional injection.

In general, it may be desirable to place the start of combustion of the homogenous change relatively close to top dead center, e.g. within several degrees of crank angle. However, as described herein, various factors may cause the timing of autoignition to retard or advance, resulting in retarding or advancing of the homogeneous charge combustion event relative to a desired timing. Such changes in the timing of the homogeneous charge combustion event may affect the relative amount of positive torque provided by combustion of the homogeneous charge. As discussed above, autoignition of the homogeneous charge relatively closer to a top dead center position of piston 14 may allow a relatively greater amount of combustion energy to be converted into positive torque on crankshaft 18 than relatively earlier autoignition. With such a variance in the positive torque on crankshaft 18, the amount of fuel required in the conventional charge may vary as well. For example, where combustion of the homogeneous charge is advanced from a crank angle of 15° before top dead center in one engine cycle to a crank angle of only 1° before top dead center in a subsequent engine cycle, the amount of homogeneous charge combustion energy converted to positive torque on crankshaft 18 will increase.

Accordingly, the conventional charge injection amount may be decreased where the homogeneous charge combustion phasing is moved relatively closer to top dead center. In one contemplated embodiment, the conventional charge fuel injection amount may be mapped not only to the engine speed and/or load, but also to the homogeneous charge combustion event timing in the same or a previous engine cycle. Thus, both the injection timing and the injection amount of the conventional charge may be based at least in part on a determined timing of a homogeneous charge combustion event, for example a determined start of combustion. The conventional charge injection timing may be based on a determined homogeneous charge combustion event timing in the same or an earlier engine cycle.

The method of the present disclosure may still further include the step of adjusting a NOx content in exhaust from engine 10, at least in part by adjusting a relative timing between the homogeneous charge combustion event and the conventional charge injection event. As described herein, the conventional charge injection event will typically be timed such that it is at least a predetermined time subsequent to the homogeneous charge combustion event in a given engine cycle. This delay allows for some cooling so that excessive NOx is not generated during the conventional diffusion burn. It may generally be desirable to inject the conventional charge only after the homogeneous charge has substantially completed burning and the cylinder is less hot than if the conventional injection was closer in time to the HCCI burn. The selected timing may also be based on other factors.

It has been discovered that placing the homogeneous charge combustion event and the conventional injection combustion event relatively closer together may result in relatively greater NOx production per each engine cycle. As described herein, however, where the homogeneous charge combustion event occurs relatively closer to a top dead center position of piston 14, operation may be relatively more efficient. Thus, determining the actual temporal separation of combustion of the homogeneous and the conventional charges may require a general balancing of efficiency versus emissions control. Certain jurisdictions may have relatively strict NOx requirements, and hence some level of efficiency may be sacrificed to ensure emissions compliance, resulting in the predetermined time between the homogeneous charge combustion event and the conventional injection event being relatively large. Alternatively, where efficiency is relatively more important, the separation of the two events may be relatively less, resulting in relatively greater NOx production.

The step of controlling a conventional injection event timing may further include injecting the conventional charge at a time based in part on an engine power output. It is well known in the art that a timing of autoignition conditions may vary depending upon an engine power output. Accordingly, the timing of the homogeneous charge combustion event may vary as the engine power output varies. At higher speeds and loads, for instance, autoignition conditions may tend to arise relatively earlier in an engine cycle. At lower speeds and loads, the cooler temperatures of the cylinder walls may retard autoignition. As described herein, the conventional injection event will typically be timed to be at least a predetermined time after the homogeneous charge combustion event. Hence, as the homogeneous charge combustion event timing changes with changes in power demand, the conventional injection event timing may be adjusted to maintain the conventional injection timing to be at least the predetermined time following the homogeneous charge combustion event.

Electronic controller 30 may further include a computer readable medium such as RAM, ROM or some other suitable medium having a combustion timing control algorithm recorded thereon. The control algorithm may include means for controlling a homogeneous charge combustion event timing in a given engine cycle, and means for controlling a conventional charge injection event timing in the given engine cycle to be at least a predetermined time after the homogeneous charge combustion event.

In one embodiment, the control algorithm may be a closed loop control algorithm which further includes means for determining a homogeneous charge combustion event timing and a feedback term corresponding to a determined homogeneous charge combustion event timing in a preceding engine cycle, for example, an immediately preceding engine cycle. The means for determining a homogeneous charge combustion event timing may further include means for determining a value indicative of a homogeneous charge start of combustion.

The means for controlling the homogeneous charge combustion event timing may further include means for commanding an injection of a liquid fuel spray via the first spray pattern of injector 50, prior to development of autoignition conditions in cylinder 20 during the given engine cycle. The means for commanding may further include means for moving outer check 52 to initiate and terminate a fuel spray via injection orifices 58.

The means for controlling a conventional injection event timing may further include means for commanding an injection of a liquid fuel spray via the second spray pattern of injector 50 subsequent to development of autoignition conditions in cylinder 20 during the given engine cycle. The means for commanding injection via the second spray pattern of injector 50 may further include means for moving second check 62 to initiate and terminate a fuel spray via injection orifices 68.

Electronic controller 30 may further include a conventional fuel injection control algorithm recorded thereon which includes means for determining a conventional fuel injection quantity based at least in part on a power demand on engine 10. The conventional fuel injection control algorithm may further include means for determining a conventional fuel injection timing. As described herein, however, both the conventional fuel injection timing and amount may vary based in part upon the timing of the homogeneous charge combustion event.

It is contemplated that conventional injections may be used to supplement homogeneous charge injections and, accordingly, conventional injections may be used primarily to account for a portion of power demand that is not met through homogeneous charge fuel injections, although the present disclosure is not limited to such an approach. This may be the case either because increased homogeneous charge fuel injection quantities are impracticable due to hardware limitations, or for some other reason such as to increase a boost pressure provided by a turbocharger that is coupled with engine 10 in a conventional manner. In a typical scenario, the conventional fuel injection control algorithm may command increasing quantities of fuel per each conventional fuel injection where the power demand on engine 10 increases, and decreasing quantities of fuel per each conventional injection where the power demand decreases. Where engine 10 enters a lower portion of a power output range, it may run solely on homogeneous charge injections.

More precise control may be achieved by mapping conventional injection amount and timing to the homogeneous charge combustion event timing. To this end, the conventional injection control algorithm may further include means for determining the conventional injection quantity based also in part on a determined homogeneous charge combustion event timing. This capability is similar to the process described above, whereby the conventional fuel injection quantities may be adjusted based upon the homogeneous charge combustion event timing.

In still another embodiment, electronic controller 30 may include a first loop algorithm, for example a closed loop algorithm, having means for controlling homogeneous charge combustion event timing in a given engine cycle, based at least in part on a determined homogeneous charge combustion event timing in a preceding engine cycle. In such an embodiment, electronic controller 30 may further include a second loop algorithm for controlling conventional injection event timing based in part on at least one of, the determined homogeneous charge combustion event timing in the preceding engine cycle and a determined homogeneous charge combustion event timing in the given engine cycle. In other words, the timing of the conventional injection event may be based on the homogeneous charge combustion phasing in a preceding engine cycle, or on the homogeneous charge combustion phasing in the present engine cycle.

INDUSTRIAL APPLICABILITY

Figure 3:
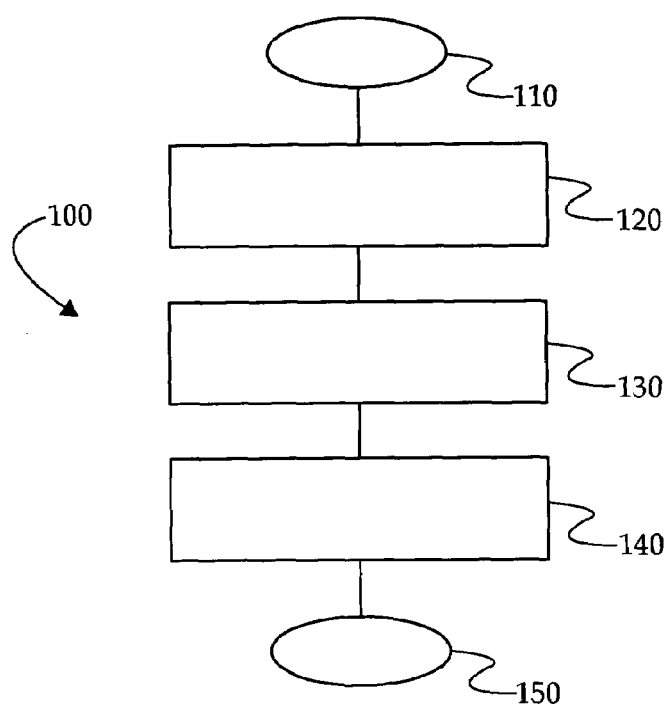
FIG. 3 is a flowchart illustrating a control process according to the present disclosure.

Referring to FIG. 3, there is shown a flowchart 100 illustrating one exemplary control process according to the present disclosure. The process of flowchart 100 will begin at a START, Box 110, and continue thenceforth to Box 120 wherein electronic controller 30 may determine a value indicative of a homogeneous charge combustion event timing in an engine cycle. From Box 110, the process may proceed to Box 130 wherein electronic controller 30 may retard or advance a homogeneous charge combustion event timing in a subsequent engine cycle based at least in part on the determined value. For example, where the determined value indicates that combustion of the homogeneous charge is beginning too early, electronic controller 30 may effect various timing control methods to retard the development of autoignition conditions in the following engine cycle. The injection timing of the homogeneous charge might also be adjusted to move the homogeneous charge combustion phasing toward a desired phasing. Where the determined value indicates that combustion of the homogeneous charge is beginning too late, for example, electronic controller 30 may effect various of the timing controls to advance the development of autoignition conditions in the following engine cycle.

Various operating parameters may affect the combustion phasing of the homogeneous charge. As described herein, during relatively lower load conditions the walls of cylinder 20 may be relatively cold, delaying autoignition conditions in a given engine cycle until relatively later. In such an instance, it may be desirable to advance the timing of development of autoignition conditions and, hence, start of combustion of the homogeneous charge. This might be achieved, for example, by increasing the compression ratio of air provided to cylinder 20 such that the cylinder pressure and temperature reach autoignition conditions relatively earlier in the engine cycle.

From Box 130, the process may proceed to Box 140 wherein electronic controller 30 may retard or advance the conventional charge injection timing in the subsequent engine cycle to be at least a predetermined time after the homogeneous charge combustion event. In other embodiments, conventional charge injection timing and amount may be mapped to engine speed and/or load alone, and will not be adjusted, but simply injected at a time determined by the map. From Box 130 the process may proceed to Box 140, a FINISH.

Figure 4:
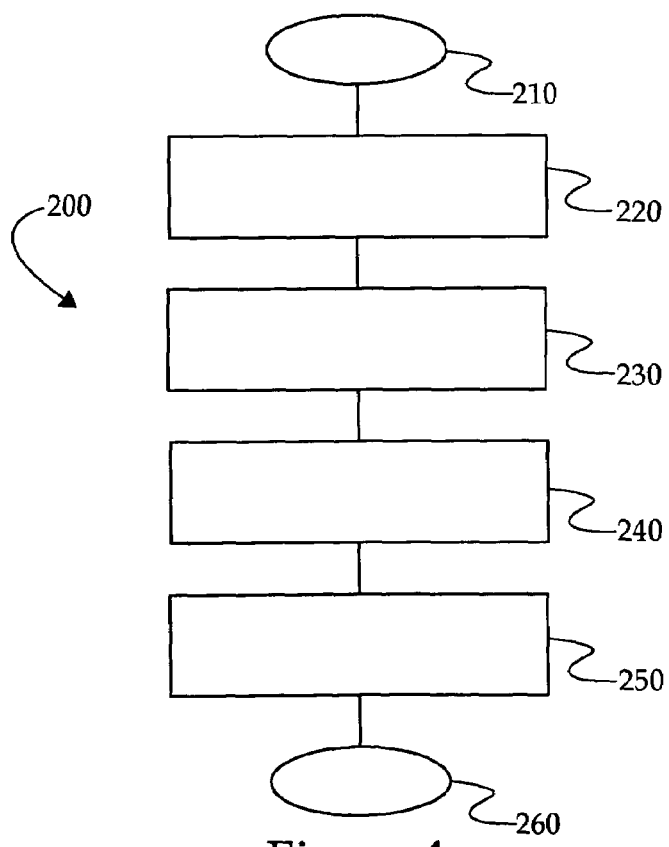
FIG. 4 is a flowchart illustrating another control process according to the present disclosure.

Turning to FIG. 4, there is shown a flowchart 200 illustrating another control process according to the present disclosure. The control process of flowchart 200 differs from that of flowchart 100, among other things, primarily in that the fuel quantity of the conventional injection may be adjusted based on charges in the timing of the homogenous change event. The charges in homogenous charge combustion event timing may result from intended adjustments via controller 30, or such variations in phasing which tend to inadvertently occur due to the inherent sensitivity of homogeneous charge combustion operation. The process of flowchart 200 will begin at a START, Box 210. From Box 210, the process may proceed to Box 220 wherein electronic controller 30 may command injection of a homogeneous charge. From Box 220, the process may proceed to Box 230 wherein electronic controller 30 may determine a value indicative of a homogeneous charge start of combustion, for example. From Box 230, the process may proceed to Box 240 wherein electronic controller 30 may determine a conventional charge fuel injection quantity based at least in part on the determined value. Subsequent to determining the conventional charge fuel injection quantity, the process may proceed to Box 250 wherein electronic controller 30 may command injection of the conventional charge. From Box 250 the process may proceed to Box 260, a FINISH.

Although much of the foregoing description is directed to illustrating the control processes of the present disclosure in the context of a single engine cycle, or a smaller number of engine cycles, it should be appreciated that in an engine operating according to the present disclosure, timing and injection control may take place over many successive cycles. Moreover, while certain of the control means for adjusting the timing of autoignition may be effected relatively rapidly, for example from one cycle to the next, others are more gradual. For instance, adjusting the coolant or oil flow as described herein may provide an adjustment of autoignition timing that takes several cycles to be effective. Variable valve timing in contrast may be used to adjust autoignition timing in an engine cycle immediately following a determination that the start of combustion of a homogeneous charge varies from a desired timing.

The relative sensitivity of many mixed mode schemes to variations in operating conditions may in many instances require regular or continuous adjustments to the homogeneous charge combustion event timing. Because it will often be desirable to temporally separate the homogeneous charge combustion event and the conventional injection event by at least a predetermined time, the conventional injection event timing will typically be adjusted in concert with the homogeneous charge combustion event timing.

For instance, where the homogeneous charge start of combustion is advanced by electronic controller 30 following a determination that the homogeneous charge start of combustion in a preceding engine cycle is too late, it may be desirable to also advance the conventional injection event. Likewise, where homogeneous charge start of combustion is determined to be too early, electronic controller 30 may retard homogeneous charge start of combustion in a subsequent engine cycle, as well as the conventional charge injection event timing.

In other embodiments, active control of the conventional injection event timing may not be desired at all. In such an embodiment, the described closed loop method of controlling the homogeneous charge combustion event timing may run continuously, advancing or retarding the homogeneous charge start of combustion as needed. The timing of the conventional charge injection event might be simply positioned a sufficient time after a calculated average time of autoignition of the homogeneous charge to ensure that acceptable operation will occur an acceptable proportion of the time.

In view of the present disclosure, it may also be appreciated that where relatively precise control is desired, the relative apportionment and even total injected fuel amount may change as the timing of the two charges' injection and combustion is varied about a top dead center position of piston 14. For instance, where the homogeneous charge combustion event is retarded to approach top dead center, the combustion energy converted into positive mechanical energy of piston 14 may change, requiring a lesser volume of fuel in the conventional charge injection. As described herein, other concerns such as NOx production and engine operating efficiency may require further adjustments to the temporal separation of the two events, in turn affecting the relative and absolute injected fuel quantities of each charge.

The present description is for illustrative purposes only, and should not be construed to narrow the breadth of the present disclosure in any fashion. Thus, those skilled in the art will appreciate that various modifications might be made to the presently disclosed embodiments without departing from the intended spirit and scope of the disclosure. For example, while mixed mode fuel injector 50 is well-suited to the present context, other injectors or other injection strategies capable of mixed mode functioning might be used without departing from the scope of the present disclosure. For example, rather than a single injector having dual concentric checks, two separate injectors might be used in certain embodiments. Other aspects, features and advantages will be apparent upon an examination of the attached drawing Figures and appended claims.

What is claimed is:

1. A method of mixed mode operation of an internal combustion engine comprising the steps of:

controlling a homogeneous charge compression ignition combustion event timing in a given engine cycle, wherein the combustion event timing is after an autoignition condition of said homogeneous charge compression ignition combustion event occurs; and controlling a conventional charge compression ignition injection event timing in the given engine cycle to be at least a predetermined time after the homogeneous charge compression ignition combustion event.

2. The method of claim 1 further comprising the steps of: adjusting a NOx content of exhaust from the internal combustion engine at least in part by adjusting a relative timing between the homogeneous charge compression ignition combustion event and the conventional charge injection event.

3. A method of mixed mode operation of an internal combustion engine comprising the steps of:

controlling a homogeneous charge compression ignition combustion event timing in a given engine cycle;

controlling a conventional charge compression ignition injection event timing in the given engine cycle to be at least a predetermined time after the homogeneous charge combustion event; and determining a value indicative of a homogeneous charge compression ignition combustion event timing in a preceding engine cycle.

4. The method of claim 3 wherein the determining step comprises determining a timing of a homogeneous charge start of combustion in the preceding engine cycle.

5. The method of claim 3 wherein the determining step comprises determining a value indicative of at least one of, a cylinder pressure and a rate of change in cylinder pressure of at least one cylinder of the internal combustion engine.

6. The method of claim 5 wherein the determining step comprises determining a selected mass fraction burn point of the homogeneous charge combustion event in the preceding engine cycle.

7. The method of claim 3 wherein the step of controlling the homogeneous charge combustion event timing in the given engine cycle comprises advancing or retarding said timing based at least in part on the determined value.

8. The method of claim 7 wherein:

the step of controlling a homogeneous charge combustion event timing further comprises the step of injecting a homogeneous fuel charge into at least one cylinder of the internal combustion engine prior to development of autoignition conditions therein during the given engine cycle; and the step of controlling a conventional charge injection event timing further comprises the step of injecting a conventional fuel charge into the at least one cylinder subsequent to development of autoignition conditions therein during the given engine cycle.

9. The method of claim 8 wherein the step of controlling a conventional injection combustion event timing comprises injecting the conventional fuel charge at a time during the given engine cycle that is based in part on an engine power demand.

10. The method of claim 8 further comprising the steps of:

determining another value indicative of a homogeneous charge combustion event timing during the given engine cycle; and controlling a conventional injection fuel amount based in part on the determined value indicative of said timing during the given engine cycle.

11. The method of claim 8 further comprising the step of controlling a conventional injection fuel amount to be less than about 50% of a total fuel injection amount during the given engine cycle.

12. The method of claim 3 wherein:

the step of controlling a homogeneous charge combustion event timing further comprises the step of injecting a homogeneous fuel charge into at least one cylinder of the internal combustion engine via a first spray pattern of a mixed mode fuel injector disposed at least partially within the at least one cylinder; and the step of controlling a conventional charge injection event timing further comprises the step of injecting a conventional fuel charge into the at least one cylinder via a second spray pattern of the mixed mode fuel injector different from the first spray pattern.

13. The method of claim 12 wherein:

the step of injecting a homogeneous fuel charge comprises injecting a liquid fuel via a first set of outlet orifices of the mixed mode fuel injector oriented at a first average spray angle relative to an axis of the at least one cylinder and defining the first spray pattern; and the step of injecting a conventional fuel charge comprises injecting a liquid fuel via a second set of outlet orifices separate from the first set and defining the second spray pattern, the second set of outlet orifices being oriented at a second average spray angle relative to said axis that is larger than the first average spray angle.

14. An internal combustion engine comprising:

a housing having at least one cylinder;

a fuel injector disposed at least partially within said at least one cylinder; and at least one electronic controller in control communication with said fuel injector and having a computer readable medium with a combustion timing control algorithm recorded thereon, said control algorithm including means for controlling a homogeneous charge compression ignition combustion event timing in a given engine cycle after an autoignition condition of said homogeneous charge compression ignition combustion event occurs, and means for controlling a conventional charge compression ignition injection event timing in the given engine cycle to be at least a predetermined time after the homogeneous charge compression ignition combustion event.

15. The engine of claim 14 wherein:

said fuel injector comprises a mixed mode fuel injector having at least two available spray patterns; and said means for controlling a homogeneous charge combustion event timing comprises means for commanding an injection of a liquid fuel via a first spray pattern of said mixed mode fuel injector prior to development of autoignition conditions in the at least one cylinder during the given engine cycle; and said means for controlling a conventional injection event timing comprises means for commanding an injection of a liquid fuel via a second spray pattern different from the first spray pattern of said mixed mode fuel injector subsequent to development of autoignition conditions in the at least one cylinder during the given engine cycle.

16. The engine of claim 14 wherein said at least one electronic controller includes a conventional injection control algorithm including means for determining a conventional fuel injection quantity based at least in part on an engine power demand.

17. An internal combustion engine comprising:

a housing having at least one cylinder;

a fuel injector disposed at least partially within said at least one cylinder;

at least one electronic controller in control communication with said fuel injector and having a computer readable medium with a combustion timing control algorithm recorded thereon, said control algorithm including means for controlling a homogeneous charge compression ignition combustion event timing in a given engine cycle, and means for controlling a conventional charge compression ignition injection event timing in the given engine cycle to be at least a predetermined time after the homogeneous charge compression ignition combustion event;

said at least one electronic controller includes a conventional compression ignition injection control algorithm including means for determining a conventional compression ignition fuel injection quantity based at least in part on an engine power demand; and said conventional compression ignition injection control algorithm further includes means for determining the conventional compression ignition injection fuel quantity based also in part on a determined homogeneous charge compression ignition combustion event timing.

18. An internal combustion engine comprising:

a housing having at least one cylinder;

a fuel injector disposed at least partially within said at least one cylinder;

at least one electronic controller in control communication with said fuel injector and having a computer readable medium with a combustion timing control algorithm recorded thereon, said control algorithm including means for controlling a homogeneous charge compression ignition combustion event timing in a given engine cycle, and means for controlling a conventional charge compression ignition injection event timing in the given engine cycle to be at least a predetermined time after the homogeneous charge compression ignition combustion event; and said control algorithm is a closed loop control algorithm further including means for determining a homogeneous charge compression ignition combustion event timing, and a feedback term corresponding to a determined homogeneous charge compression ignition combustion event timing in a preceding engine cycle.

19. The engine of claim 18 wherein said means for determining a homogeneous charge combustion event timing further includes means for determining a value indicative of a homogeneous charge start of combustion.

20. An article comprising:

a computer readable medium including a first loop control algorithm recorded thereon having means for controlling a homogeneous charge compression ignition combustion event timing in a given engine cycle in an internal combustion engine, based at least in part on a determined homogeneous charge compression ignition combustion event timing in a preceding engine cycle, and a second loop algorithm for controlling a conventional compression ignition injection event timing, based in part on at least one of, the determined homogeneous charge compression ignition combustion event timing in the preceding engine cycle and a determined homogenous charge compression ignition combustion event timing in the given engine cycle.

* * * * *